Oct. 25, 1966  W. H. SMYERS, JR  3,281,075
REFRIGERATION SYSTEM INCLUDING PRESSURE ACTUATED VALVE
Filed April 1, 1964  2 Sheets-Sheet 1
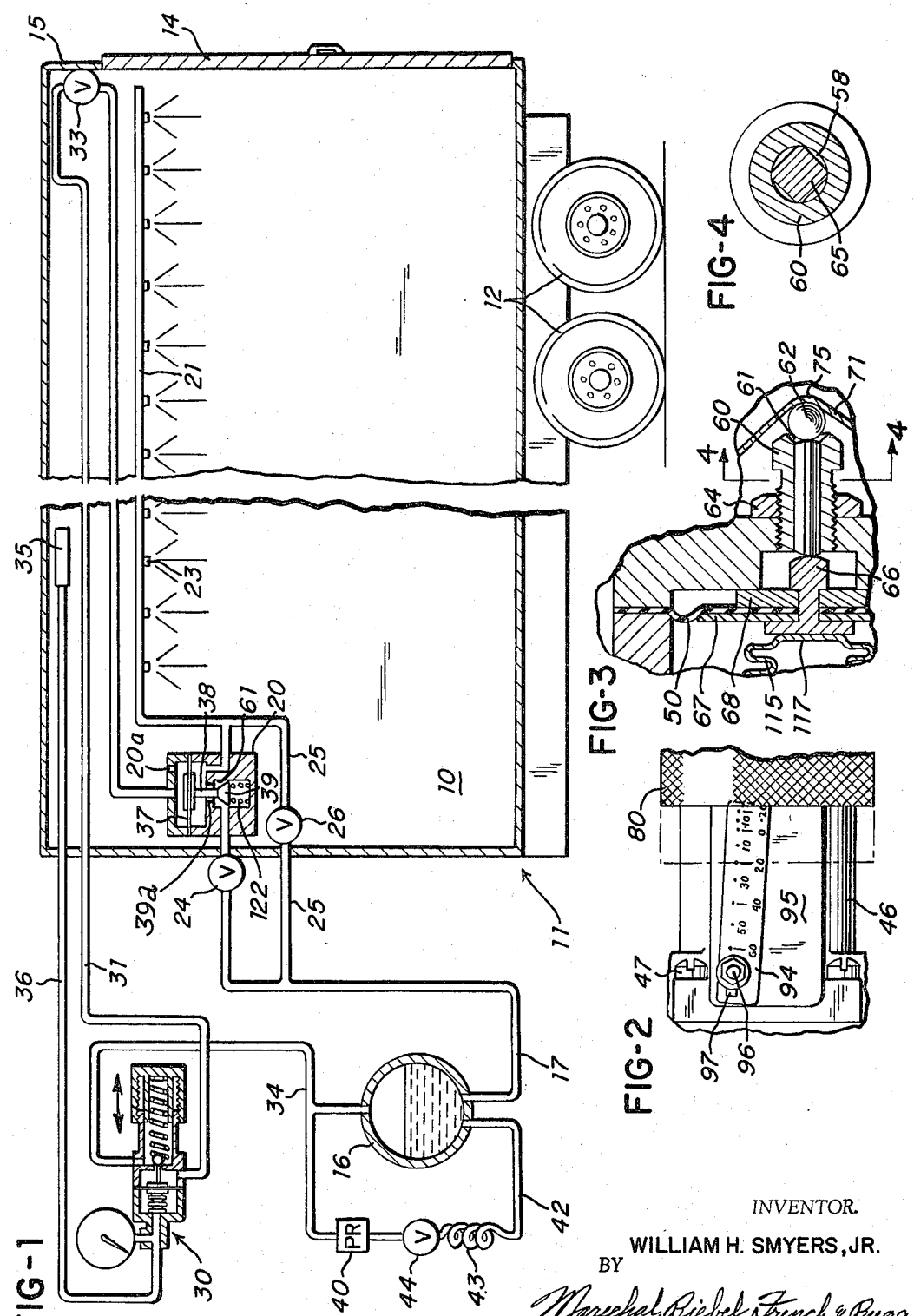
INVENTOR.
WILLIAM H. SMYERS, JR.
BY
Marechal, Biebel, French & Bugg
ATTORNEYS Oct. 25, 1966 W. H. SMYERS, JR 3,281,075
REFRIGERATION SYSTEM INCLUDING PRESSURE ACTUATED VALVE
Filed April 1, 1964
2 Sheets-Sheet 2

INVENTOR.
WILLIAM H. SMYERS, JR.
BY
Marechal, Biebel, French & Bugg
ATTORNEYS

United States Patent Office 3,281,075
Patented Oct. 25, 1966

3,281,075
REFRIGERATION SYSTEM INCLUDING PRESSURE ACTUATED VALVE
William H. Smyers, Jr., Dayton, Ohio, assignor to Koehler-Dayton, Inc., a corporation of Ohio
Filed Apr. 1, 1964, Ser. No. 356,426
8 Claims. (Cl. 236—99)

This invention relates to a heat transfer system and more particularly to a liquefied gas refrigeration system having improved control apparatus.

In particular, the invention relates to a refrigeration system of the type which sprays a liquefied gas, usually nitrogen, into the space to be cooled so that the evaporation of the liquid absorbs heat and correspondingly reduces the temperature. Systems of this type find wide use in truck and railway cars adapted for transporting meat, produce, and other perishables, since the nitrogen gas reduces spoilage and the systems are self-pressurizing and capable of quicky cooling a large space as a result of the large temperature differential between the cargo and the boiling point of the gas (—320° for nitrogen). These systems also are much more dependable and less expensive than the conventional compressor type as a result of the relatively few moving parts, and the overall system tends to be lighter in weight so that an increased load can be carried by the vehicle.

However, the liquid gas system is not without disadvantages and perhaps one of the most serious is that many of the systems use electrical controls requiring the use of electrical power so that a storage battery must be provided or the system cannot be separated from its prime mover, as required for railroad cars and "piggyback" transportation of semi-trailers on flat bed railroad cars. Moreover, many of these systems use a liquid filled temperature probe which must be frequently recalibrated since a dent in the probe or the lines leading thereto changes the volume thereof and generates an erroneous temperature indication. The liquid probe is generally slow to react to temperature variations and requires compensation for changes in ambient atmospheric temperature since the liquid in the line leading to the probe also senses a temperature. In addition, the controllers used to regulate the flow of liquid to the storage space are quite complex and expensive since they use many levers, linkages, knife edges, steel cables, bellows and springs. They can effectively handle only a predetermined inlet gas pressure, thus requiring a separate pressure regulator before the gas pressure generated in the liquid storage tank can be used. Because of their complex construction they are also sensitive to shock loads such as rail car "humping," highway chuck holes and the like.

Accordingly, an important object of this invention is to provide an improved liquid gas refrigeration system which overcomes the disadvantages mentioned above and is completely self-operating so that no electrical or other auxiliary power is required.

A further object of the invention is to provide a refrigeration system of the liquid gas type which is inexpensive in cost and simple in operation for maximum dependability, and further to provide control apparatus for the aforesaid refrigeration system which includes a temperature sensing device which is quick acting and has a controller which operates effectively regardless of the inlet gas pressure which may vary over a wide range as the pressures are generated in the liquid gas storage tank.

Another object of this invention is to provide a liquid gas refrigeration system having a pneumatic control system which utilizes the gas presures generated in the liquid storage tank to control the flow of the liquid into the space being cooled, and particularly to provide such a system with a temperature sensing device which is insensitive to denting or bending of the probe or the lines leading thereto and which requires no compensation for ambient temperature even though the controller is mounted on the exterior of a vehicle.

Another object of this invention is to provide a controller for a liquid gas refrigeration system which is simple and rugged in design and operation and has only a minimum number of moving parts, and further to provide such a controller which is capable of withstanding vibration and high shock loads without frequent readjustment or replacement of parts.

A further object of this invention is to provide a controller for a liquid gas refrigeration system which can be completely assembled at a factory and which does not require recalibration after installation, and particularly to provide such a controller which is capable of receiving a wide range of pressures while maintaining the output pressure at a level determined by an adjustable setting on the controller and the pressure developed within the probe in response to the temperature in the space being cooled.

Other objects and advantages of the invention will be apparent from the following description, the accompanying drawings and the appended claims.

In the drawings—

FIG. 1 is a schematic view of the liquid gas refrigerating system in accordance with the invention;

FIG. 2 is an enlarged view of a portion of the controller taken along the line 2—2 of FIG. 6;

FIG. 3 is an enlarged sectional view of the valve mechanism of the controller;

FIG. 4 is a sectional view taken along the line 4—4 of FIG. 3;

Figure 5:
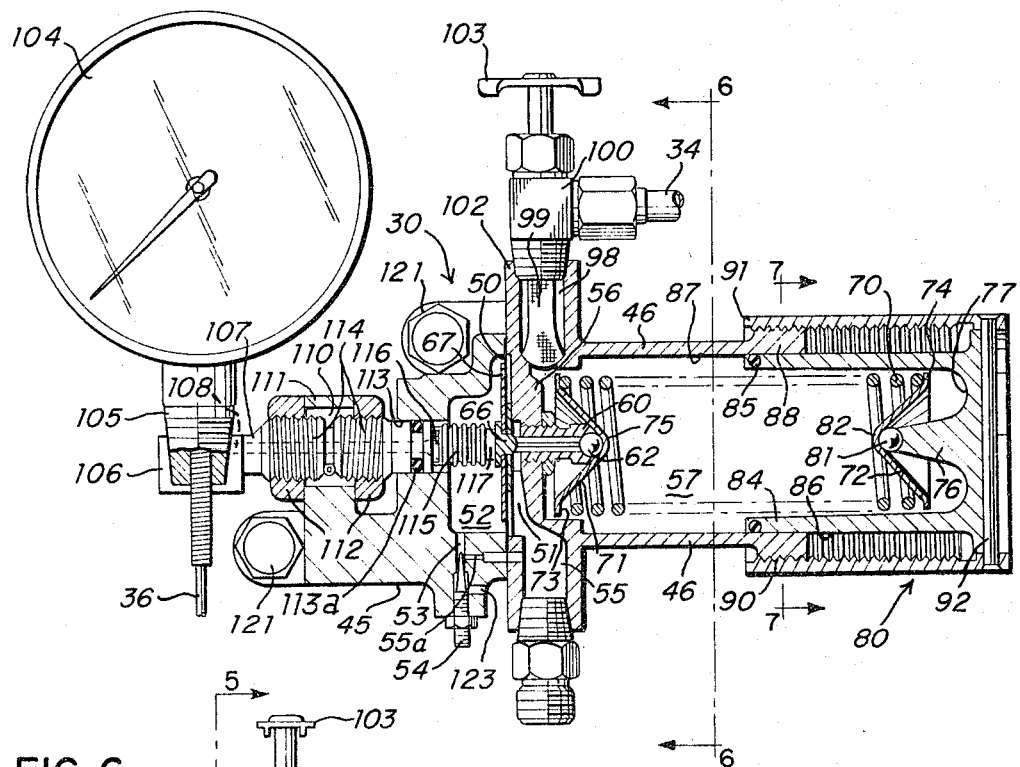
FIG. 5 is a sectional view taken centrally through the controller of the invention along the line 5—5 of FIG. 6.

Referring to the drawings wherein a preferred embodiment of the invention is shown, FIG. 1 illustrates the liquid gas refrigeration system for cooling the interior space 10 of the truck trailer 11. For the purposes of illustration, this truck trailer is shown as a conventional semi-trailer having the tandem wheels 12 and an entrance through the door 14 in the rear 15 of the trailer. The system is however capable of cooling any confined space, although it is particularly useful with a moving vehicle such as a truck or a railroad car. Many types of cryogenic liquids can be used in this system, but for purposes of explanation the system will be described as using liquid nitrogen.

The refrigeration system includes a storage tank 16 which has a conduit 17 leading to the interior 10 of the trailer 11 and this conduit has a pressure actuated liquid control valve 20 therein for regulating the flow of liquid to the conduit 21 which extends along the length of the trailer 11 and has holes or spray nozzles 23 therein. The pressure relief valve 24 is provided in the conduit 17 for exhausting high pressures above a predetermined safe pressure from the conduit 17 or tank 16 to the atmosphere. The bypass conduit 25 is provided around the valve 20 so that, if the valve 20 becomes inoperative for one reason or another, the manually actuated valve 26 can be opened to introduce the liquid nitrogen into the space 10.

The operation of the liquid control valve 20 is regulated by a controller 30 which is connected thereto through the elongated conduit 31 having a normally open valve 33 therein which is open when the rear door 14 of the trailer 11 is closed. The valve 33 therefore prohibits operation of the pressure actuated valve 20 when the rear door 14 of the trailer is open since, if the nitrogen is sprayed during the time this door is open, injury to a person in the trailer and waste of liquid nitrogen may occur. The controller 30 regulates the gas pressure applied to the pressure actuated valve 20 through conduit 31 by controlling the gas supplied from the storage tank 16 and through the conduit 34 in response to the temperature within the truck as sensed by the probe 35 connected to the controller 30 through the conduit 36. Thus when the gas pressure from the tank 16 is connected to the valve 20, which is normally closed, the diaphragm 37 therein moves the stem 38 downwardly to unseat the poppet 39 and allow flow through the conduit 17 at a rate proportional to the extent that the poppet 39 is spaced from the seat 39a.

A pressure build-up system be incorporated into the refrigeration system as shown in FIG. 1 including a pressure regulator 40 in the conduit 42 for sensing the pressure in conduit 34 and, when a preset low pressure is sensed, for opening the conduit 42 to allow liquid to flow from the tank 16 through the evaporation coil 43, the shut off valve 44 and into the conduit 34 leading to the controller 30. This pressure system is conventional and is used to insure that the pressure within the conduit 34 does not fall below a certain value so that, as will be seen, the controller 30 will operate effectively even with large pressure fluctuations in conduit 34.

Referring to FIGS. 2–7, the controller 30 includes a pair of housing members 45 and 46 which are secured together by the screws 47 (FIGS. 2 and 6) extending through suitable apertures in the housing member 46 and into threaded engagement with the housing member 45. A flexible diaphragm 50 is clamped between these two housing members 45 and 46 and divides the interiors thereof into a fluid tight outlet chamber 51 which communicates with the entire exposed area of the adjacent surface of the diaphragm 50, and an open chamber 52 which is connected to the atmosphere through the restricted passage 53 in the housing member 45 which has a manually adjustable needle valve 54 for varying the flow through this passage. The outlet chamber 51 is connected through the outlet passage 55 (FIG. 5) to the conduit 31 leading to the liquid control valve 20.

The partition 56 within the housing member 46 separates the outlet chamber 51 from an inlet chamber 57 except for the passage 58 in the tubular seat member 60 (FIGS. 3 and 5). The member 60 has a tapered valve seat 61 at one end thereof which cooperates with the ball 62 or its equivalent, and this member is threadedly secured in the partition 56 and the lock nut 64 is utilized to insure that the member 60 will remain in position. The square cross-section valve stem 65 reciprocates in the passage 58 between the ball 62 and the abutment member 66 mounted centrally on the diaphragm 50 by the annular plates 67 and 68 on either side of the flexible portion of the diaphragm. Thus when the diaphragm 50 moves to the right, as viewed in FIG. 5, the valve stem 65 will be similarly moved to unseat the ball 62.

The ball 62 is urged toward the seat 61 by the elongated coil spring 70 which is confined between the frustoconical retainers 71 and 72, each of which has its outer periphery 73 and 74 in engagement with the coil spring 70. The innermost apex portion 75 of the retainer 71 is in contact with the ball 62 and confines its movement so that it is at all times closely associated with its valve seat 61. The other retainer 72 is held in position by the axial projection 76 on the interior surface 77 of the adjustment screw 80. A ball bearing 81 is spaced between this projection and the innermost apex portion 82 of the retainer 72 for permitting relative rotation of the screw 80 and the retainer 72.

The adjustment screw 80 includes an inner tubular wall 84 which has an inner diameter somewhat greater than the outer diameter of the spring 70 and an outer diameter slightly less than the inner diameter of the housing member 46. An O-ring seal 85 is carried in a ring groove in the wall 84 between the outer surface 86 of the wall 84 and the inner surface 87 of the housing member 46 to insure that the inlet chamber 57 will be fluid tight at all times. The annular projection 88 is provided on the right-hand end of the housing member 46, as viewed in FIG. 5, and has exterior threads thereon for engagement with the similar threads on the inner surface 90 of the outer tubular wall 91 of the adjustment screw 80. Rotation of the screw 80 changes the distance between the ball 62 and the ball bearing 82 to change proportionately the biasing effect of the spring 70, as will be described. For facilitating manufacturing, the inner and outer walls 84 and 91 of the adjustment screw 80 may be formed as separate tubular members and rigidly interconnected by the pin 92 which extends radially between these walls and is held in place by deforming the opposite ends thereof.

The relative position of the adjustment screw 80 and the housing member 46 is indicated precisely by the elongated scale 94 which is adjustably secured to the flat outer surface 95 of the housing member 46 by the screw 96, as shown in FIG. 2. When the adjustment screw 80 is moved to the left to the position shown in broken lines, it can be seen that the scale reads a value of 20 which is calibrated so that the temperature within the trailer 11 will be maintained at a temperature of 20° F. Slight adjustments for calibration purposes can be made in the position of the scale 94 by loosening the screw 96 and moving the scale to the right or left within the slot 97 or by pivoting the scale about the screw 96.

The inlet chamber 57 is connected to the conduit 34 from the storage tank 16 through the inlet passage 98 which has a filter 99 securely mounted therein to insure that dirt and other foreign particles do not obstruct or interfere with the operation of the controller 30. This filter is held in place by the manually actuated valve 100 which is rotatably secured in the boss 102 which surrounds the inlet passage 98 and is operated by rotating a handle 103 in a conventional manner to open and close the passage 98 as required for assembly, maintenance, and the like, or for shutting down operation of the controller 30.

The liquid vapor probe 35 is connected to the controller 30 through the conduit 36 which is connected to a pressure gage 104 for indicating the pressure in the probe 35 and/or the temperature in the interior 10 of the trailer 11. The gage 104 has the inlet pipe 105 threadedly secured in the annular support 106 which is formed integrally with the elongated connector 107 having the passageway 108 therethrough in communication with the pipe 105 and conduit 36. The connector 107 is secured to the housing member 45 by inserting it through the aperture 110 in the upstanding flange 111 and tighteneng the nuts 112 onto the enlarged exteriorly threaded portions 114 and against the opposite sides of the flange 111. The right-hand end 116 of the connector fits snugly into the complementary opening 113 in the housing member 45 and the O-ring seal 113a is positioned in a mating groove in the connector 107 for creating a fluid tight seal between the connector 107 and the housing member 45.

The small bellows 115 is secured to the right-hand end 116 of the connector 107 with the interior thereof in fluid tight communication with the passage 108 so that the pressure in the probe 35 and conduit 36 are connected thereto. The right end 117 of the bellows 115, as viewed in FIG. 5, is sealed, and thus the temperature sensing system is completely closed, and the end 117 abuts the member 66 on the diaphragm 50 so that expansion of the bellows 115 exerts a relatively large force on the member 66. The bellows 115 is preferably constructed of metal, such as brass, and has a relatively small diameter since a comparatively high pressure acts therein, as will be seen. Calibration of the bellows 115 with respect to the scale 94 is accomplished by moving the connector 107 and the bellows 115 axially by loosening one of the rings 112 and tightening the other, or by moving the scale 94 with respect to the surface 95 by loosening the screw 96.

The probe 35 and the conduit 36 are preferably filled with fluid such as carbon dioxide at a pressure above that required to cause the fluid to be partly liquid for all desired refrigeration temperatures, $CO_2$ liquid and vapor are in equilibrium at about 900 p.s.i. and 75° F., at 800 p.s.i. and 65° F., and at 200 p.s.i. and −30° F. By pressurizing the probe and conduit to a pressure of 850 p.s.i. at 75° F. all of the $CO_2$ will be in the gaseous state, but as soon as any portion of the probe system is cooled to less than about 65° F., some of the $CO_2$ will condense, and the pressure in the probe system will be a single valued function of the temperature of the coolest part of the probe system. The function is the vapor pressure of the fluid and is exemplified by the two approximate sample points 800 p.s.i. at 65° F., and 200 p.s.i. at −30° F., these points representing the range of interest for food refrigeration. Naturally other fluids with other vapor pressure curves could be chosen for other temperature ranges such as industial processes, etc. As a result of the liquid-vapor equilibrium condition, a change in volume of the probe caused, for example, by denting or bending of the conduit 36 during installation, will have no effect on the accuracy of the sensed temperature since the vapor pressure-temperature curve is independent of volume changes. Thus if the probe 35 is dented to decrease the volume thereof substantially, a proportional increase in the pressure cannot occur but instead an additional portion of the $CO_2$ gas passes into the liquid state.

Thus there is no change in pressure that can be caused by a decrease or increase in volume until all the gas becomes liquefied or all the liquid $CO_2$ is evaporated. The result is a temperature sensing system which uses a fluid pressure to indicate temperature change while being insensitive to those volume changes which might occur in installing and using such a sensing system. This feature permits the controller 30 and probe 35 to be interconnected and charged at the factory, without requiring adjustment or recalibration after installation. Moreover, this system will be quicker acting than many comparable liquid systems since there is only a small amount of liquid in the probe and a comparatively much smaller amount of heat must be absorbed to heat that liquid and to vaporize a small amount of the liquid as opposed to increasing the entire volume of the liquid as required in a completely liquid probe system.

Since the fluid in the probe is all vaporized for temperatures above about 65° F., further increases in temperature, especially of just the probe itself such as occur during steam cleaning, do not yield very large changes in pressure, so there is no need for over-ride protection for steam cleaning. Since the lowest food refrigeration temperature (−30° F.) corresponds to a pressure of about 200 p.s.i., changes in barometer pressure yield negligible effect on the indicated temperature. The saturated $CO_2$ will not freeze unless temperatures of −70° F. or lower are applied, thus reducing the danger of the probe becoming inoperative due to close proximity of the liquid in the tank 16, usually nitrogen. While carbon dioxide gas is preferred for a probe used in a food refrigeration application since it is inexpensive and non-toxic, it is within the scope of the invention to use other gases so long as they meet the desired functional requirements.

No compensation must be made for the portion of the conduit 36 outside the cooled space 10 since heat absorbed by this conduit will merely tend to expand the gas in this portion of the conduit which, in turn, will tend to raise the pressure in the probe 35. Since this pressure cannot be raised due to the afore mentioned non-varying vapor pressure-temperature relationship, a portion of the gas in the probe 35 becomes liquid so that the pressure created in the probe 35 and the conduit 36 by the temperature in the space remains unchanged.

Figure 6:
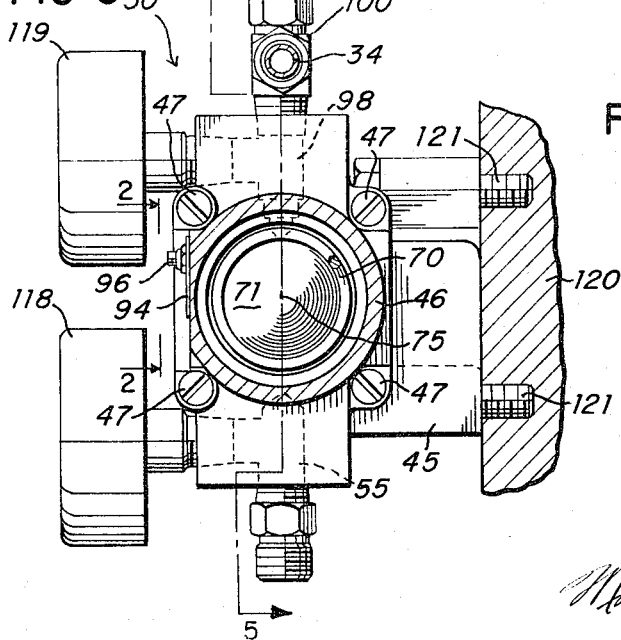
FIG. 6 is a sectional view taken essentially along the line 6—6 of FIG. 5.
Figure 7:
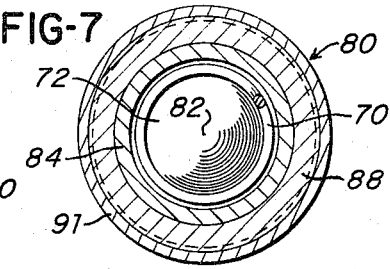
FIG. 7 is another sectional view taken along the line 7—7 of FIG. 5.

As shown in FIG. 6, a pair of pressure gages 118 and 119 is attached to the housing member 46 in communication with the outlet and inlet passages 55 and 98, respectively, so that the operator can readily determine the pressures present in the system. The controller 30 may be secured to a vertical support wall 120 (FIG. 6) by the screws 121 which extend through the housing member 45 and into the wall, as shown.

In operation, assuming the system is properly mounted and adjusted on the trailer 11, it is merely necessary to place the cargo therein and close the door 14. When the desired temperature is set on the controller 30, by positioning adjustment screw 80 with respect to scale 94, the gas pressure directly from the tank flows through the conduit 34 and into the inlet passage 98 and the inlet chamber 57 of the controller 30.

If the temperature within the space 10 is above that set on the controller 30, the increase is sensed by the probe 35 and communicated to the controller 30 in the form of a proportionately increased pressure in the bellows 115. This increased pressure expands the bellows 115 against the bias of the spring 70 causing the diaphragm 50 and the stem 65 to move to the right to unseat the ball 62 and connect the gas pressure in the inlet chamber 57 to the outlet chamber 51 through the passage 58. This gas pressure immediately flows from the outlet chamber 51 through the conduit 31 to the liquid control valve 20 to push down on diaphragm 37 and separate the poppet 39 from its seat. When the valve 20 opens the pressure in the tank 16 forces the liquid nitrogen through the conduits 17 and 21 and it is sprayed into the space 10 to reduce the temperature therein.

As the gas pressure fills the outlet chamber 51, the diaphragm 50 is urged in a direction opposite to that of the bellows 115 and tends to close the ball 62. The net effect is to compensate for wide variance in the inlet gas pressure from the tank 16 to obtain a substantially fixed outlet gas pressure in the conduit for each particular probe temperature. Thus when the outlet pressure is too high for a particular probe temperature it will act on the diaphragm 50 to close the ball 62 and reduce the output gas pressure, whereas if the outlet pressure is low, the pressure in the chamber 51 tending to close the ball 62 is also reduced so that the diaphragm 50 exerts a smaller force opposing the bellows 115 and the ball 62 is opened to a greater extent. This results in a fixed outlet pressure for each probe temperature, irrespective of the inlet pressure so that a separate pressure regulator in the conduit 34 is not required in order to insure proper operation of the liquid control valve 20. The spring rates of the bellows 115 and spring 70 are chosen so as to result in only small force changes over the strokes required, so that the output pressure is also essentially independent of changes in flow required in conduit 31, and of dimensional changes such as due to wear of the ball 62 or seat 61.

As the temperature in the trailer 11 reaches that set on the controller 30, the pressure in the probe 35 is reduced correspondingly so that the force to expand the bellows 115 is reduced and the ball 62 is moved by the spring 70 closer to its seat 61 to reduce the outlet pressure, and proportionally close the liquid control valve 20 and reduce the rate at which the nitrogen is sprayed into the trailer 11. These reductions continue as the temperature drops until the ball 62 is closed, which occurs when the temperature set on the controller 30 is reached, at which time the liquid control valve 20 is also closed. It is noted that the pressure in conduit 31 and valve 20 is being continuously bled to the atmosphere through restriction 20a so that pressure is not trapped therein when the ball 62 is seated.

The liquid control valve 20 is spring loaded to be closed when the controller output pressure in conduit 31 is a certain value above the spray manifold pressure, for instance, 5 p.s.i. Since the spray manifold 21 will be zero p.s.i.g. when there is no flow in it, any controller 30 with output pressure less than 5 p.s.i.g. results in the valve 20 being closed. An increase of probe temperature which yields a higher output pressure, for instance 6 p.s.i.g. in conduit 31, will result in a pressure of 1 p.s.i.g. in the spray manifold 21.

When the temperature in the trailer 11 rises, the pressure in the probe 35 and conduit 36 increases causing the bellows 115 to expand and again open the ball 62, as described above, to again open the liquid control valve 20 and spray liquid nitrogen into the trailer 11. This process generally stabilizes so that a continual small flow is passing through the valve 20 to just maintain the desired temperature in the trailer 11 and it continues without the use of exterior electrical power or other energy until such time as the controller 30 is shut down by closing the valve 100 in the inlet conduit 34, or the liquid gas in the tank 16 is exhausted.

If at any time during the operation it is desired to change the temperature within the trailer 11, the adjustment screw 80 is rotated to the appropriate temperature as indicated on the scale 94. Movement of the screw 80 effects a corresponding change in the bias of the spring 70 so that the effectiveness of the bellows 115 is increased or reduced to automatically operate the liquid control valve to achieve the desired temperature.

The sensitivity of the controller 30 can be increased so that wide variations in heat load and hence wide variations in required controller output pressure can all be obtained with a very small change in temperature (for instance a fraction of a degree). This sensitivity is generally obtained at the expense of greater temperature oscillations during the stabilization time, so that different truck systems may require different sensitivities. For this purpose the restricted passage 55a connects the outlet chamber 51 with the passage 53 leading to the open chamber 52.

The previous description of the operation of the controller 30 assumed that the needle valve 54 was open for low sensitivity and the flow area of passage 53 was large compared to the flow area of restriction 55a. There was therefore a steady flow of gas through passage 55a, past the needle valve seat, and through the inlet passage 123. During such a setting of the needle valve, the pressure in chamber 52 is essentially atmospheric and diaphragm 50 senses the entire gage output pressure of port 55. When higher sensitivity is desired, the needle valve 54 is moved to a position where there is more restriction of the passage 53 so that the pressure in chamber 52 is somewhere in between the pressure in chamber 51 and atmospheric pressure.

As has been previously explained, a certain temperature change will cause a corresponding change in pressure differential on the diaphragm 50. This diaphragm pressure differential is equal to the full outlet pressure at port 55 when needle valve 54 is open so that the pressure in chamber 52 is atmospheric. With needle valve 54 partly closed, that same change in temperature causes the same change in pressure differential across the diaphragm, but this differential now corresponds to a much larger change in outlet pressure since the outlet pressure equals the pressure drop across the diaphragm plus the pressure drop from chamber 52 to atmosphere. The net result is that the liquid control valve 20 will open and close in much narrower temperature band to maintain a fixed temperature in the truck 11.

Naturally, minor modifications of parts of the system can allow changes in the modes of operation. For instance, if the action of the valve 20 is reversed, to be spring-loaded-open and pressurized to close, the controller 30 and valve 20 may cooperate to control a heating system instead of a cooling system. Alternately, a heating system could be controlled by having the valve 20 as shown in FIG. 1, but by reversing the action of the controller so that ball 62 and seat 60, are on the opposite side of partition 56 and act to shut off the flow and decrease the pressure in chamber 51 as the pressure inside bellows 115 increases. It is also possible to make both of the above changes in order to control a refrigeration system in a manner that would fail "open" or "cold" in case the diaphragm of valve 20 ruptures.

It is also apparent that the controller 30 and pressure actuated valve 20 do not depend on the use of spray nozzles, but can be used to control the flow of fluids through conventional heat exchangers.

The invention has thus provided an inexpensive and reliable refrigeration system, which does not require a large number of critical components of close tolerance. The temperature sensing portion of the combination is quick acting and free from any detrimental effects from denting or ambient temperatures, steam cleaning temperatures, and barometric pressure changes. Moreover, the system can be completely assembled and charged prior to installation without requiring recalibration, and the controller is simple in design and capable of operation in response to a wide range of inlet pressures, and of withstanding vibration shock loads normally incurred by vehicles of all types.

The type of fluids used in the system may be varied without departing from the scope of the invention. Thus the probe may use different gasses for different temperature ranges and conditions, and the liquid in tank 16 may be a sublimation solid such as solid carbon dioxide without effecting the basic operation of the system. Moreover, the probe system may operate satisfactorily in some installations even though the gas is not always within the liquid-vapor equilibrium range so that there is a volumetric change with temperature changes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A controller for a heat transfer system including a pressure actuated valve for controlling the flow of fluid under pressure, said controller comprising, a housing having a partition which separates the interior thereof into inlet and outlet chambers, a flexible diaphragm mounted in said housing to define one wall of said outlet chamber, a valve passage interconnecting said inlet and outlet chambers, a valve member cooperating with said valve passage for controlling the flow of fluid therethrough in response to movement of said diaphragm, manually adjustable spring means in said housing chamber for urging said valve to close said passage, said spring means including a coil spring having a retainer at each end thereof, one of said retainers being in contact with said valve, said housing including a screw portion defining a portion of said inlet chamber, the other of said retainers being in contact with said screw portion so that the bias of said spring is varied by rotating said screw portion with respect to the remainder of said housing, temperature sensing means connected to said diaphragm for applying a force to urge said diaphragm to open said valve member in response to a temperature increase, said valve member adapted to connect the fluid under pressure in said inlet chamber to said outlet chamber so that at least a portion of such pressure acts against the pressure created on said diaphragm by said sensing means when said valve member is open, means connecting said outlet chamber to the pressure actuated valve so that the pressure supplied thereto is responsive to the temperature sensing means and insensitive to variation in the fluid under pressure, and vent means for slowly venting pressure from said outlet chamber.

2. A control system for a refrigeration system including a fluid actuator for controlling the flow of a refrigerant from a storage tank to spray nozzle in a compartment comprising, a housing having a partition therein which separates the interior thereof into inlet and first chambers, means including a flexible diaphragm mounted on said housing to separate said first chamber into open and outlet chambers, a bellows mounted in said open chamber for urging said diaphragm in one direction, a valve passage in said partition connecting said inlet and outlet chambers, means forming a valve seat in said valve passage, a valve cooperating with said valve seat for controlling the flow of fluid through said passage, a valve stem associated with said diaphragm and extending into said valve passage for separating said valve from said seat, spring means for urging said valve against said valve seat, a temperature sensitive probe adapted for mounting in the compartment and for connection to the interior of said bellows to urge said diaphragm toward said valve seat in response to a temperature increase to open said valve, said valve passage adapted to connect the tank with said inlet chamber when said valve is open so that the pressure in the tank urges said diaphragm away from said valve, a restricted passage connecting said open and outlet chamber, manually adjustable means for connecting said restricted passage to the exterior of said housing to increase the sensitivity of the system by reducing the pressure differential acting on said diaphragm, and means connecting said outlet chamber to the actuator so that said valve is opened when the force generated by said bellows is greater than the total of the forces exerted on said diaphragm by pressure in said oulet chamber and the force of said spring.

3. A control system for a refrigeration system including a fluid actuator for controlling the flow of liquid gas from a storage tank to spray nozzle in a compartment comprising, a housing having a partition therein which separates the interior thereof into inlet and outlet chambers, a flexible diaphragm mounted in said housing to define one wall of said outlet chamber, a bellows mounted in said housing coaxial with said diaphragm and having an end held against movement and the other end connected to the center of said diaphragm for effecting movement of said diaphragm to urge said diaphragm in one direction, a valve passage in said partition coaxial with said bellows for connecting with said inlet and outlet chambers, means forming a valve seat at the end of said valve passage in said inlet chamber, a valve cooperating with said valve seat for controlling the flow of fluid through said passage, a valve stem cooperating with said diaphragm and extending into said valve passage for separating said valve from said seat, spring means in said inlet chamber coaxial with said passage for urging said valve against said valve seat, a temperature sensitive probe adapted for mounting in the compartment and for connection to said bellows to urge said diaphragm toward said valve in response to a temperature increase to open said valve, means adapted to connect the tank with said inlet chamber so that the pressure in the tank urges said diaphragm away from said valve when said valve is open, means connecting said outlet chamber to the actuator so that said valve is opened when the force exerted by said bellows is greater than the total of the forces exerted on said diaphragm by pressure in said outlet chamber and the force of said spring to connect the pressure in the tank to the actuator causing the actuator to connect the tank to the nozzles, and vent means for slowly venting pressure from said outlet chamber.

4. A control system for a cryogenic refrigeration system including a fluid actuator for controlling the flow of liquid from a storage tank to spray nozzle in a compartment comprising, a housing having a partition therein which separates the interior thereof into inlet and outlet chambers, a flexible diaphragm mounted in said housing and defining one side of said outlet chamber, a bellows unit mounted in said housing for urging said diaphragm in one direction, said bellows unit including an expandable bellows having a closed end abutting said diaphragm and an integral collar means on the other end, means on said housing for mounting said bellows unit for adjustable movement toward and away from said diaphragm for ease in adjusting said bellows, a passage in said partition with said inlet and outlet chambers, a valve cooperating with said valve seat for controlling the flow of fluid through said passage, valve stem means mounted on said diaphragm for separating said valve from said seat, spring means in said inlet chamber for urging said valve toward closed position, a temperature sensitive probe adapted for mounting in the compartment and for connection to said collar means of said bellows unit to expand said bellows and urge said diaphragm to open said valve upon an increase in temperature in the compartment, means adapted to connect the tank with said inlet chamber so that when said valve is open the pressure in the tank urges said diaphragm to close said valve, means connecting said outlet chamber to the actuator so that said valve is opened when the forces generated by said bellows unit exceed the forces exerted thereon by said spring means and said diaphragm, and vent means for slowly venting pressure from said outlet chamber.

5. A control system for a heat transfer system including a fluid actuator for controlling the flow of a fluid under pressure comprising, a housing having a partition therein which separates the interior thereof into inlet and first chambers, pressure sensitive movable means mounted on said housing to separate said first chamber into open and outlet chambers, expandable means mounted in said housing for urging said movable means in one direction, a valve passage in said partition connecting said inlet and outlet chambers, means forming a valve seat in said valve passage, a valve cooperating with said valve seat for controlling the flow of fluid through said passage, a valve stem means associated with said movable means and extending into said valve passage for separating said valve from said seat, a temperature sensitive probe adapted for mounting in the compartment and for connection to the interior of said expandable means to urge said movable means toward said valve seat in response to a temperature increase to open said valve, said valve passage adapted to connect said inlet chamber with said outlet chamber when said valve is open so that the fluid under pressure urges said movable means away from said valve, means connecting a reference pressure to said open chamber, vent means for venting pressure from said outlet chamber, and means connecting said outlet chamber to the actuator so that said valve is opened when the force generated by said expandable means is greater than the total of the forces exerted on said movable means.

6. A control system as defined in claim 5 wherein said temperature sensitive probe is filled with a preset volume of carbon dioxide to maintain a portion thereof in a liquid state at temperatures required for cooling meats and the like so that volumetric change in said probe system will not change the pressure therein or the calibration of the controller.

7. A control system as defined in claim 5 wherein said means connecting a reference pressure to said open chamber is a restricted passage interconnecting said outlet and said open chambers.

8. A control system for refrigeration system including a fluid actuator for controlling the flow of a refrigerant from a storage tank to spray nozzles in a compartment comprising, a housing having a partition therein which separates the interior thereof into inlet and first chambers, diaphragm means mounted on said housing to separate said first chamber into open and outlet chambers, expandable means mounted in said open chamber for urging said diaphragm means in one direction, a valve passage in said partition connecting said inlet and outlet chambers, means forming a valve seat in said valve passage, a valve cooperating with said valve seat for controlling the flow of fluid through said passage, a valve stem means associated with said diaphragm means and extending into said valve passage for separating said valve from said seat, spring means for urging said valve against said valve seat, a temperature sensitive probe adapted for mounting in the compartment and for connection to the interior of said expandable means to urge said diaphragm means toward said valve seat in response to a temperature increase to open said valve, said valve passage adapted to connect said inlet chamber with said outlet chamber when said valve is open so that the pressure in the storage tank urges said diaphragm means away from said valve, means connecting a reference pressure to said open chamber, vent means for venting pressure from said outlet chamber, and means connecting said outlet chamber to the actuator so that said valve is opened when the force generated by said expandable means is greater than the total of the forces exerted on said diaphragm by pressure in said outlet chamber and the force of said spring.

References Cited by the Examiner

UNITED STATES PATENTS

| 2,571,625 | 10/1951 | Seldon | 62—225 |
| 3,166,913 | 1/1965 | Carter | 62—223 X |

MEYER PERLIN, *Primary Examiner.*